United States Patent

Rejsa et al.

[15] 3,675,567

[45] July 11, 1972

[54] MEAT INJECTION APPARATUS

[72] Inventors: Jack J. Rejsa, Minneapolis; James A. Meyer, Saint Louis Park, both of Minn.

[73] Assignee: The Pillsbury Company, Minneapolis, Minn.

[22] Filed: June 8, 1970

[21] Appl. No.: 44,297

[52] U.S. Cl. ............................................................99/257
[51] Int. Cl. ............................................................A23l 3/34
[58] Field of Search................99/257, 255, 256, 107, 159; 17/25; 107/69, 1 R, 1 B

[56] References Cited

UNITED STATES PATENTS

| | | | |
|---|---|---|---|
| 2,418,914 | 4/1947 | Tichy | 99/107 |
| 2,674,179 | 4/1954 | Harrington | 99/257 |
| 2,756,666 | 7/1956 | Zaenkert | 99/257 |
| 2,841,818 | 7/1958 | Griffith | 17/25 |
| 3,016,004 | 1/1962 | Harper et al. | 99/255 |
| 3,436,230 | 4/1969 | Harper et al. | 99/255 X |
| 3,494,302 | 2/1970 | Wolf et al. | 107/1 R |
| 3,507,207 | 4/1970 | Rogers et al. | 99/257 |

*Primary Examiner*—Walter A. Scheel
*Assistant Examiner*—Arthur O. Henderson
*Attorney*—Ronald E. Lund, James V. Harmon and M. Paul Hendrickson

[57] ABSTRACT

Apparatus for injecting seasoning and flavoring liquids into poultry meat composed of a storage reservoir or hydraulic accumulator from which fluid is pumped at a pressure between about 1,000 and 5,000 psi to injection nozzles under the control of a solenoid valve. Each solenoid valve is turned rapidly on and off by an electronic timer. As the nozzles are moved at the same speed of the meat to be injected, a high velocity jet of liquid lasting 0.1 to 0.5 seconds is shot from the nozzle into the meat and is dispersed in the tissue.

5 Claims, 3 Drawing Figures

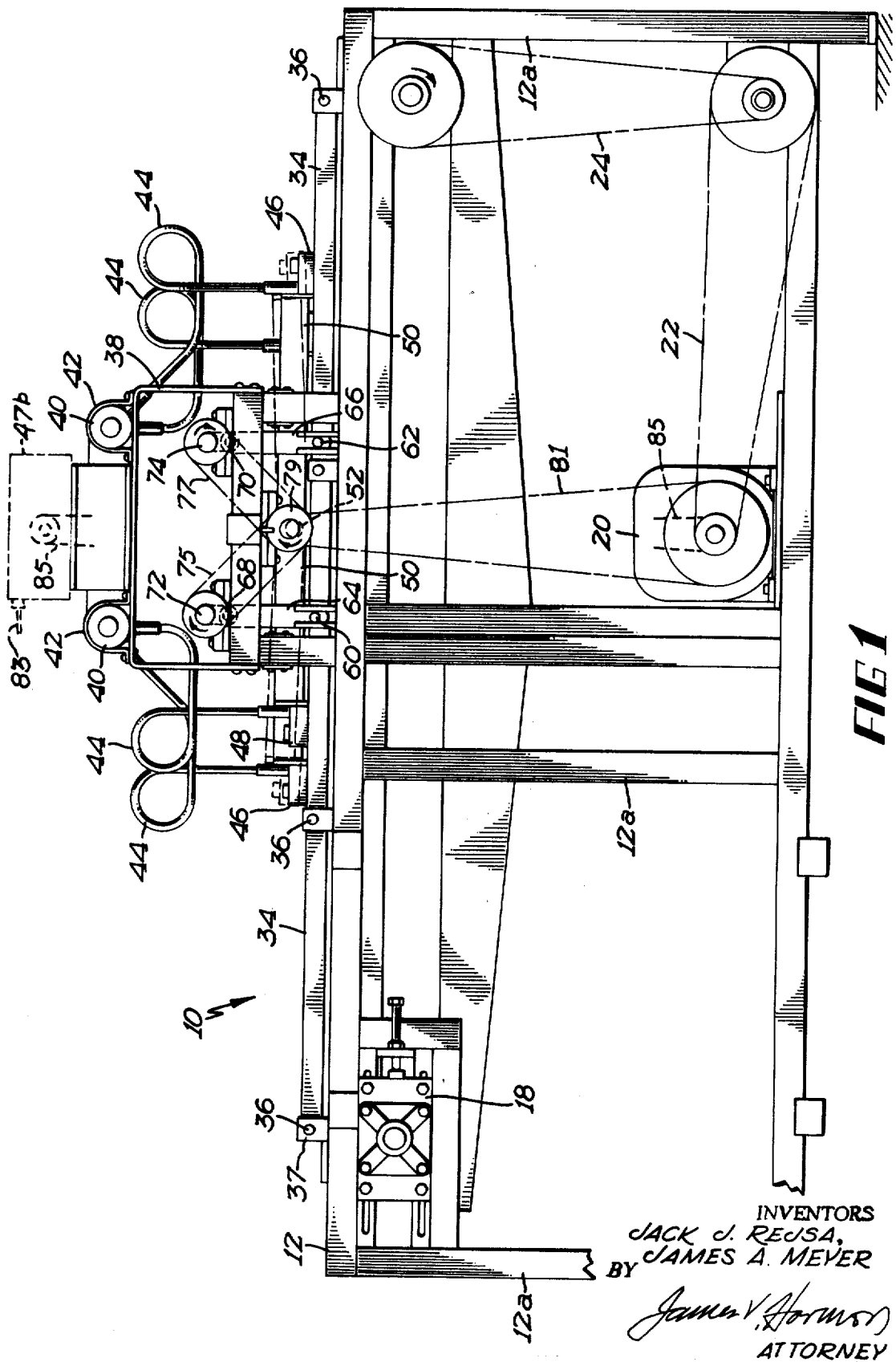

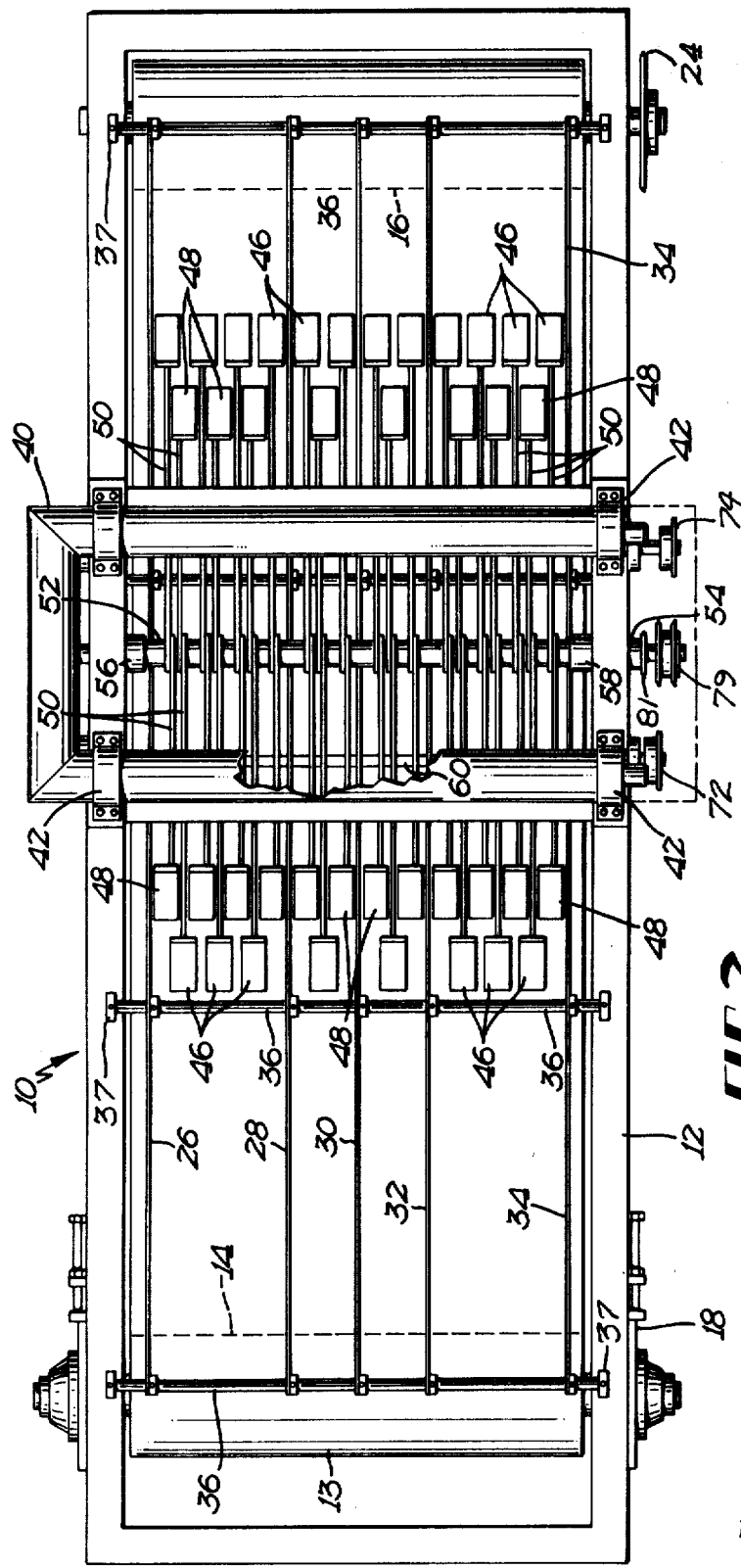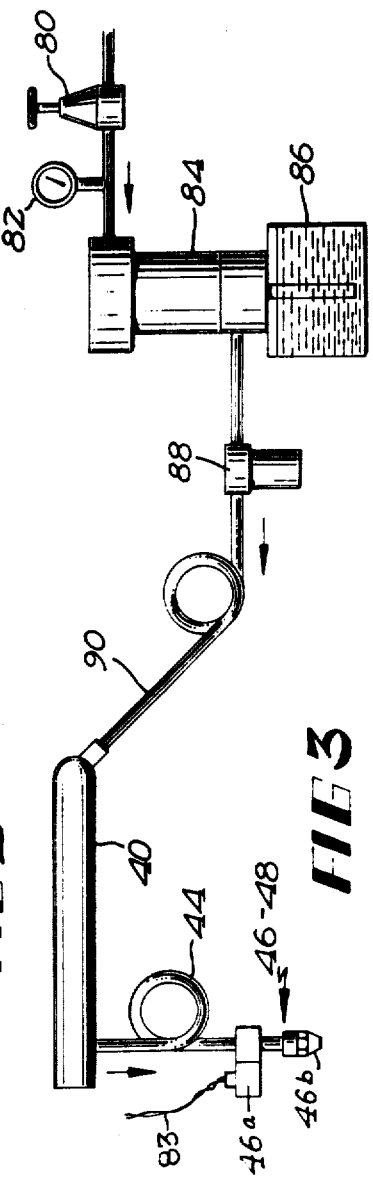

MEAT INJECTION APPARATUS

The present invention relates to food processing equipment and more particularly to an apparatus for introducing flavoring or tenderizing materials into meat products.

The primary objective of the invention is to rapidly and efficiently introduce tenderizing and/or flavorizing liquids into fresh meat products and particularly cut up pieces of chicken at rates of as high as 3,000 pounds or more of meat products per hour.

Equipment previously proposed for injecting fluids into meat has been complicated in construction and therefore subject to occasional malfunction as well as being partially ineffective in operation. The apparatus described in a prior art device employs a plurality of nozzles for injecting a pickling liquid into meat as it is moved through the device. A plurality of oscillating rods rise periodically to advance the meat through the apparatus. The mechanism for raising and lowering of these rods is complex and tends to increase the chances of breakdown. Moreover, the jarring of the meat tends to increase the amount of loss or weep of injected fluid. In addition to these problems, the apparatus is not well-suited for simultaneously treating different cuts of meat and for injecting a different amount of fluid into each cut.

Other prior art devices are not suited for simultaneously injecting several grades of meat without disturbing the pieces or for injecting products such as cut up pieces of chicken due to the space which would be present between the cut up parts if an attempt were made to do so.

In another prior art device poultry pieces are injected by being pierced with needles positioned on the exterior surface of a large drum. The pieces are then immersed in a liquid flavoring agent. The air is then withdrawn from the pockets to facilitate transfer of the liquid into the pockets. In this process, needles can be broken by contact with bones and the transfer of microorganisms from one piece to another in the flavoring solution is an undesired side effect.

Another problem encountered is the greater liquid intake of large poultry parts compared with small parts.

In view of these and other deficiencies of the prior art, the invention has the following objectives and advantages: (a) the ability to rapidly and efficiently inject up to 3,000 pounds of meat products an hour with liquid flavoring or tenderizing materials, or both; (b) a provision for simultaneously injecting different cuts of meat; (c) the ability to simultaneously inject different quantities of liquid into pieces traveling through segregated sections of the apparatus; (d) the provision of an apparatus which is trouble free, employs relatively simple operating mechanism and requires little attention while in operation; (e) a provision for preventing the pieces from being jarred during operation whereby the weepage of injected liquids is held to a minimum; (f) provision for injecting liquids in a grid pattern composed of rows and columns of injection sites with a provision for controlling which ones of the sites an injection is made and which sites no injection is made; (g) provision for injecting at sites close together in smaller parts and at sites located further apart in larger parts to prevent the injection of more liquid than desired.

These and other more detailed and specific objects of the invention will be apparent in view of the following specification and drawings wherein:

FIG. 1 is a side elevational view of the invention,
FIG. 2 is a plan view of the invention, and
FIG. 3 is a semidiagrammatic fluid flow diagram.

Briefly, the present invention provides a meat injection apparatus comprising a conveyor for transferring pieces through the apparatus, a plurality of injection nozzles which are brought close to or into contact with the pieces periodically as they travel through the apparatus. A means is provided for synchronizing the motion of the nozzles of the pieces so that they travel in the same speed and direction during the injection of fluid into the piece. The nozzles are then moved to a new position and again synchronized with the movement of the meat through the apparatus at which time fluid is again expelled through the nozzles. In this way a grid-like pattern comprising rows and columns of injection sites is established. The total quantity of fluid expelled from a plurality of nozzles is preferably regulated and used to control the quantity of fluid expelled during each pulse. The nozzle preferably comprises jet injection nozzles rather than needles.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Refer now particularly to FIGS. 1 and 2. Shown in the Figures is an injection apparatus 10 comprising a framework 12 composed of upright columns 12a to which horizontally extending beams are secured at their upper and lower ends. Supported for rotation upon this framework is a horizontally disposed belt conveyor comprising an endless belt 13 which can be formed from rubber or a composition of rubber and fabric entrained between a pair of rolls 14 and 16 (FIG. 2). The roll 14 is journaled for rotation in a belt tightener 18 of conventional known construction for maintaining the belt 13 at the proper tension.

The belt is driven during operation by means of a motor 20 connected through a chain and sprocket assembly 22–24 to the center shaft of the roll 16. The roll 14 functions as an idler.

During operation, the conveyor 13 is driven at a constant speed by the motor 20 to thereby advance the meat such as cut up chicken parts (not shown) from the left side of the apparatus, as seen in the Figures, to the right side thereof on the upper surface of the belt 13.

As the cut pieces of meat travel from the inlet end of the apparatus on the left to the outlet end of the apparatus on the right, they are guided between vertically disposed parallel longitudinally extending guide plates or dams 26, 28, 30, 32, and 34, all of which are supported by laterally disposed rods 36 which are themselves connected at their ends by suitable brackets 37 to the framework 12. The guides 26–34 not only keep the pieces from falling off the sides of the belt but also define four longitudinally extending channels in which as many as four different cuts of meat can be simultaneously conveyed past the injection heads to be described below. Normally, however, two different cuts will be treated at once; for example, breasts will be placed between guides 26, 28, and thighs between guides 32, 34 whereas legs will be placed between guides 28 and 30 and wings between guides 30 and 32.

Suitably connected to the center of the apparatus and extending upwardly therefrom is a riser 38 which functions as a support for a fluid pressure storage manifold 40 which is secured to the riser 38 by brackets 42. In the manifold 40, the liquid to be injected is maintained at elevated pressure preferably on the order of from 1,000 to 5,000 psi. From the mainfold, fluid is distributed through a plurality of flexible pressure resistant hoses 44 to four sets of nozzles including two distal sets of laterally aligned nozzles 46 and two proximal sets of nozzles 48 each of which is secured to the end of a longitudinally extending arm 50 that is mounted for pivotal movement at the center of the apparatus upon the throw 52 of a crank shaft 54 journaled for rotation within bearings 56 and 58 which are themselves supported upon the framework 12 so that each rotation of the shaft 54 the throw 52 moves the central ends of the levers 50 through a circular path. In practice it was found suitable to position the throw 52 about 1/2 inch from the center of the shafts 54.

Extending laterally beneath the arms 50 are longitudinally spaced laterally extending lifting rods 60 and 62 but only the ones closest to the observer can be seen in FIG. 1. The upper ends of the connecting rods 64 and 66 are mounted upon the cranks 68 and 70 of crank shafts 72 and 74 respectively which are driven during operation by chain and sprocket assembly 75–77 connected at 79 to shaft 54. Shaft 54 is in turn driven by chain and sprocket assembly 81 that is coupled at its lower end to the shaft of drive motor 20.

In operation the shafts 72, 74, and 54 are all synchronized precisely with the forward movement of the conveyor belt. It can be seen that as the shafts 72 and 74 rotate, the connecting rod 64 and 66 will periodically elevate the free ends of the arms 50 and the nozzles 46, 48 mounted at their ends. The timing and relative speeds of the shafts 72, 74, and 54 and the eccentricity of the throw on each crank shaft 72, 74, and 54 being appropriately related to advance the nozzles 46 and 48 from left to right as seen in the Figures at the same speed as the meat is advanced thereunder by the conveyor 13 while the elevating rods 60 and 62 are in their lowered positions. In this way, the nozzles are placed against or adjacent to the meat and their movement toward the right is synchronized with the meat for a brief period of time. It is during this time that fluid supplied from manifold 40 on lines 44 is injected by the nozzles. A moment later the rods 60, 62 raise the free ends of arms 50 and the nozzles mounted upon them while the throw 52 carries the nozzles toward the left. As seen in FIG. 3, conductors 83 are connected between each solenoid valve 46a and an electrical control box 47b which is shown in FIG. 1. Each of nozzles 46-48 includes a solenoid operated valve 46a and an injection head 46b (FIG. 3) which is preferably of the kind described in U.S. Pat. application Ser. Number 646 titled APPARATUS FOR LIMITING THE PENETRATION DEPTH OF INJECTED MATERIALS, filed Jan. 5, 1970, by Jeffery John Sholl, or other injection nozzle for meat products known to those skilled in the art. To ensure proper nozzle pulse timing, a mechanical connection 85 is provided between the electrical time 47b and the drive motor 20 to effect synchronization. The time 47b can comprise any suitable well-known mechanical or electrical timer that is available commercially.

During operation, the nozzles 46 and 48 are periodically lowered into contact with the cut pieces and simultaneously advanced in the same speed direction by the throw 52 of crank 54 while fluid is injected as controlled by duration of "on" time as established by timer 47b to thereby define a grid of injection sites composed of rows and columns which are spaced the same lateral distance as that between the nozzles. The longitudinal spacing is constant. In a typical operation, the sites are spaced longitudinally by a distance of about one-half inch and a pulse is sent to each solenoid once each time each nozzle is synchronized with the meat. On the other hand, where large pieces such as breasts are positioned between guides 26, 28 and thighs between guides 32, 34, it may be desirable to send pulses for opening the corresponding nozzles only on one end of machine; e.g., those nozzles 46 and 48 at the left side of the machine and above the guide 30 as seen in FIG. 2. This can be accomplished by interrupting the flow of fluid to those nozzles or by opening the electrical circuit to the timer 47b. When this is done, the injection sites will be separated laterally by the same distance but longitudinally by twice the original distance; namely, by one inch while the smaller parts such as legs and thighs which are injected simultaneously below partition 30 of FIG. 2 will be separated longitudinally by one-half inch.

The total quantity of liquid injected each time liquid is expelled is controlled by regulating the time that the nozzle is held in the open position. It should be understood that at the greater pressures, more liquid will be expelled during the same period of time. It has been found that if the pressure is about 1,500 psi, about 0.25 cc of liquid is injected through one nozzle of a suitable construction in a period of about 0.1 to 0.5 seconds. If less fluid is to be injected, the duration of the injection pulse is reduced.

Refer now to FIG. 3 which illustrates a flow diagram for supplying liquid under pressure from the nozzles. A suitable pump 84 which in this case comprises a reciprocating pump operated by compressed air supplied by valve 80 at a pressure indicated by a gauge 82 pumps liquid from storage reservoir 86 through a filter 88 to the manifold 40 through the distribution lines 44 to the nozzles 46-48.

The invention will be better understood by reference to the following example.

EXAMPLE 1

In an apparatus as described above, an injection solution having the composition set forth in Table 1 below was injected at a pressure of 1500 psi.

TABLE 1

|  | Parts by Weight |
|---|---|
| Water | 89.32 |
| Salt | 4.88 |
| A mixture of sodium tri-polyphosphate, tetra-sodium pyrophosphate, sodium acid pyrophosphate | 3.10 |
| Monosodium glutamate | 1.20 |
| Sol. pepper | 0.75 |
| Sol. celery | 0.75 |

The nozzles were constructed as described in U.S. Pat. application titled APPARATUS FOR LIMITING THE PENETRATION DEPTH OF INJECTED MATERIALS, Ser. No. 646 filed Jan. 5, 1970, by Jeffrey John Sholl.

The nozzles were spaced one inch laterally from one another and injection pulses were spaced longitudinally by a distance of about one-half inch. The pieces were weighted before and after injection. A weight increase of about 6 percent was achieved. The injected pieces showed significant improvement in taste and texture.

We claim:

1. A meat injection apparatus comprising in combination a supporting framework, a drive motor, a conveyor connected to the drive motor and mounted upon the framework for advancing the meat products from one end of the apparatus to the other, nozzles mounted intermediate the ends of the conveyor, said nozzles being supported for movement upon the framework upon axes parallel to the path of movement of meat products as they are carried through the apparatus by the conveyor, drive means operatively connected to the nozzles for moving the nozzles back and forth along the axes, the speed of movement of the nozzles moving on said axis when traveling in the same direction as the meat products being on the same order as the speed of the meat products themselves and timing means operatively associated with the nozzles for opening the nozzles when the nozzles move in the same direction as the meat products, the meat products being given stable support by the conveyor at all times as they travel through the apparatus to thereby prevent excessive weep of injected liquid said nozzles being mounted upon the ends of longitudinally extending arms, the opposite ends of the arms being mounted upon the throw of a crank journalled for rotation upon a laterally extending axis and the drive motor being connected to the crank whereby the nozzles are moved back and forth along said axis.

2. The apparatus of claim 1 wherein a means is provided for periodically raising the nozzles to lift them away from the meat products when traveling counter to the direction of the travel of the meat products through the apparatus.

3. The apparatus of claim 1 wherein laterally extending nozzle elevating members are operatively associated with the arms for raising the nozzles periodically, a crank is operatively connected to the elevating members for raising the elevating members periodically in synchronization with the longitudinal movement of the arms, the elevating members being raised when the crank moves the nozzles counter to their direction of movement of the meat through the apparatus.

4. A meat injecting apparatus comprising a supporting framework, an endless belt conveyor for transferring meat products from one end of the apparatus to the other, drive means for the conveyor, guide mounted adjacent the conveyor and extending parallel thereto for defining at least first and second segregated channels for movement of the products from one end of the apparatus to the other upon the conveyor, a first set of nozzles mounted upon the apparatus for injecting fluid into meat products traveling along the first channel, a second set of nozzles for injecting meat products traveling along the second channel, means for increasing the quantity of expelled fluid for the first set of nozzles relative to the second set of nozzles whereby the first set of nozzles will inject a larger total quantity of liquid over a period of time than the second set of nozzles and the meat products traveling in the first channel will contain a greater level of injected liquid than those traveling in the second channel.

5. The apparatus according to claim 4 wherein said nozzles are spaced apart longitudinally of the apparatus and some of said longitudinally spaced apart nozzles are rendered inactive while others remain active thereby injecting a reduced total quantity of liquid over a period of time.

* * * * *